United States Patent
Kell et al.

(10) Patent No.: US 10,345,785 B2
(45) Date of Patent: Jul. 9, 2019

(54) TOOL HAVING ROTATABLE MEMBER FOR MACHINING AN OBJECT AND SENSOR TO SENSE OBJECT

(71) Applicant: ROLLS-ROYCE plc, London (GB)

(72) Inventors: James Kell, Nottingham (GB); Thomas Frederick Danvers, Wirksworth (GB); Adam Nagy, Loughborough (GB); Dragos Aurelian Axinte, Nottingham (GB); Mark Hugh Raffles, Nottingham (GB); Amir Rabani, Nottingham (GB); Salvador Cobos-Guzman, Nottingham (GB)

(73) Assignee: ROLLS-ROYCE plc, London (GB)

( * ) Notice: Subject to any disclaimer, the term of this patent is extended or adjusted under 35 U.S.C. 154(b) by 333 days.

(21) Appl. No.: 15/051,844

(22) Filed: Feb. 24, 2016

(65) Prior Publication Data
US 2016/0256967 A1    Sep. 8, 2016

(30) Foreign Application Priority Data
Mar. 5, 2015    (GB) .................................. 1503683.3

(51) Int. Cl.
| G05B 19/19 | (2006.01) |
| B23Q 17/24 | (2006.01) |
| B23Q 15/02 | (2006.01) |
| F01D 15/06 | (2006.01) |
| B23Q 1/50  | (2006.01) |

(Continued)

(52) U.S. Cl.
CPC ............... *G05B 19/19* (2013.01); *B23Q 1/50* (2013.01); *B23Q 15/02* (2013.01); *B23Q 17/2233* (2013.01); *B23Q 17/2471* (2013.01); *F01D 15/06* (2013.01); *B23P 6/002* (2013.01); *G05B 2219/36281* (2013.01); *G05B 2219/36342* (2013.01); *G05B 2219/37205* (2013.01); *G05B 2219/50351* (2013.01)

(58) Field of Classification Search
CPC ...... B23Q 1/0036; B23Q 15/02; B23Q 17/24; B23Q 17/2471; F01D 15/06; G05B 19/19
See application file for complete search history.

(56) References Cited

U.S. PATENT DOCUMENTS

| 3,412,976 A | * | 11/1968 | Arneson, Jr. ............ B23Q 5/06 |
|             |   |         |                            118/50 |
| 4,192,551 A |   | 3/1980  | Weimer et al.                     |
| 4,864,777 A |   | 9/1989  | McLaughlin et al.                 |

(Continued)

FOREIGN PATENT DOCUMENTS

| JP | S63-191569 A | 8/1988 |
| WO | 96/12873 A1  | 5/1996 |

OTHER PUBLICATIONS

Aug. 4, 2015 Search Report issued in British Application No. 1503683.3.

(Continued)

*Primary Examiner* — Matthew E. Gordon
(74) *Attorney, Agent, or Firm* — Oliff PLC

(57) ABSTRACT

A tool for machining an object comprising: a first part including a rotatable member, the rotatable member being rotatable to cause rotation of a machine tool; a second part; a joint coupling the first part and the second part to enable relative movement between the first part and the second part; and a sensor to sense an object to be machined.

18 Claims, 9 Drawing Sheets

(51) Int. Cl.
*B23Q 17/22* (2006.01)
*B23P 6/00* (2006.01)

(56) References Cited

U.S. PATENT DOCUMENTS

| | | |
|---|---|---|
| 5,077,941 A * | 1/1992 | Whitney .................. B24B 19/26 |
| | | 451/11 |
| 5,102,221 A | 4/1992 | Desgranges et al. |
| 5,349,940 A | 9/1994 | Takahashi et al. |
| 5,475,485 A | 12/1995 | Diener |
| 5,644,394 A | 7/1997 | Owens |
| 6,606,541 B2 | 8/2003 | Vaidyanathan |
| 6,839,954 B2 | 1/2005 | Gunstone |
| 6,899,593 B1 | 5/2005 | Moeller et al. |
| 6,915,236 B2 | 7/2005 | Tanner et al. |
| 7,097,539 B2 | 8/2006 | Moeller et al. |
| 8,726,502 B2 | 5/2014 | Clark et al. |
| 2005/0107001 A1 | 5/2005 | Moeller et al. |
| 2005/0148287 A1* | 7/2005 | Moeller .................. B24B 19/14 |
| | | 451/6 |
| 2008/0171495 A1 | 7/2008 | Diat et al. |
| 2009/0001059 A1 | 1/2009 | Spallek et al. |
| 2014/0179200 A1 | 6/2014 | Clark |

OTHER PUBLICATIONS

Jul. 11, 2016 Extended Search Report issued in European Patent Application No. 16156884.5.

* cited by examiner

[RELATED ART]

TOOL HAVING ROTATABLE MEMBER FOR MACHINING AN OBJECT AND SENSOR TO SENSE OBJECT

TECHNOLOGICAL FIELD

The present disclosure concerns a tool for machining an object.

BACKGROUND

Gas turbine engines may be used, for example, to propel aircraft and/or to generate electrical energy. FIG. 1 illustrates an example of a gas turbine engine 10 having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Gas turbine engines may require maintenance and repair during their operational life. For example, a fan blade or a compressor blade of a gas turbine engine may become damaged during operation (for example, the fan or compressor blade may become chipped) and such damage may impair the performance of the gas turbine engine. A highly skilled engineer may be required to perform the repair. However, such repair may be costly and/or may not be performed in a timely manner where the gas turbine engine is located remote from a repair centre.

BRIEF SUMMARY

According to various examples there is provided a tool for machining an object, the tool comprising: a first part including a rotatable member, the rotatable member being rotatable to cause rotation of a machine tool; a second part; a joint coupling the first part and the second part to enable relative movement between the first part and the second part; and a sensor to sense an object to be machined.

The sensor may be configured to provide image data and/or measurement data of the object to be machined.

The second part may comprise the sensor.

The second part may comprise a cover defining an aperture. The sensor may be positioned within the cover and adjacent to the aperture.

The tool may further comprise an energy transmission member extending between the first part and the second part and across the joint. The energy transmission member may be arranged to provide energy to the rotatable member to cause rotation of the rotatable member.

The energy transmission member may comprise a conduit to provide fluid to the rotatable member.

The energy transmission member may comprise an electrical cable to provide electrical energy to the rotatable member.

The rotatable member may comprise a turbine.

The rotatable member may comprise an electrical motor.

The joint may comprise one or more cables coupled to the first part. The one or more cables may be moveable relative to the second part to enable the first part to be moved relative to the second part.

The tool may further comprise a machine tool coupled to the rotatable member to receive torque from the rotatable member.

The machine tool may comprise a blending tool.

According to various examples there is provided apparatus comprising: a controller to: receive data from the sensor of a tool; determine control of the tool using the received data; and provide a control signal to cause control of the tool. In some embodiments, the tool may be structured as described in any of the preceding paragraphs. In other embodiments, the tool may have an alternative structure and may be an inspection apparatus and include, for example, a Raman spectrometer, an imaging device (such as a camera) or an Ultraviolet (UV) inspection device.

The controller may be to determine whether relative movement between the tool and the object is required to enable machining of the object by the tool.

The controller may be to determine control of the tool by: determining whether the object has a shape that differs from a predetermined shape above a threshold level; and determining a machining path for the tool to bring the shape of the object at least towards conformity with the predetermined shape.

The controller may be to determine whether the object has a shape after machining that differs from the predetermined shape above a threshold level; and determining a further machining path for the tool to bring the shape of the object further towards conformity with the predetermined shape.

The controller may be configured to operate without user intervention.

The controller may comprise a first controller and a second controller. The first controller may be to determine the control of the tool. The second controller may be to provide the control signal to the tool to control the apparatus. The first controller may communicate with multiple second controllers at a time in a multi-device configuration.

The second controller may be located in closer proximity to the tool than the first controller.

The first controller may be configured to receive data from the sensor. The first controller may be configured to provide the data to the second controller. The second controller may be configured to determine a machining path for the tool.

The second controller may be to receive the machining path from the first controller. The second controller may be to convert the machining path into control signals to control the tool.

The apparatus may further comprise an actuator to receive the control signals from the controller and to control the tool using the control signals.

According to various examples there is provided a method comprising: receiving data from the sensor of the tool as described in any of the preceding paragraphs; determining control of the tool using the received data; and providing a control signal to cause control of the tool.

The method may further comprise determining whether relative movement between the tool and the object is required to enable machining of the object by the tool.

Determining control of the tool may include determining whether the object has a shape that differs from a predetermined shape; and determining a machining path for the tool to bring the shape of the object at least towards conformity with the predetermined shape where it is determined that the shape of the object differs from the predetermined shape.

The method may further comprise determining whether the object has a shape after machining that differs from the predetermined shape; and determining a further machining path for the tool to bring the shape of the object further towards conformity with the predetermined shape where it is determined that the machined shape of the object differs from the predetermined shape.

The method may be performed without user intervention.

According to various examples there is provided a computer program that, when read by a computer, causes performance of the method as described in any of the preceding paragraphs.

According to various examples there is provided a non-transitory computer readable storage medium comprising computer readable instructions that, when read by a computer, causes performance of the method as described in any of the preceding paragraphs.

The skilled person will appreciate that except where mutually exclusive, a feature described in relation to any one of the above aspects may be applied mutatis mutandis to any other aspect.

BRIEF DESCRIPTION

Examples will now be described with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 2:
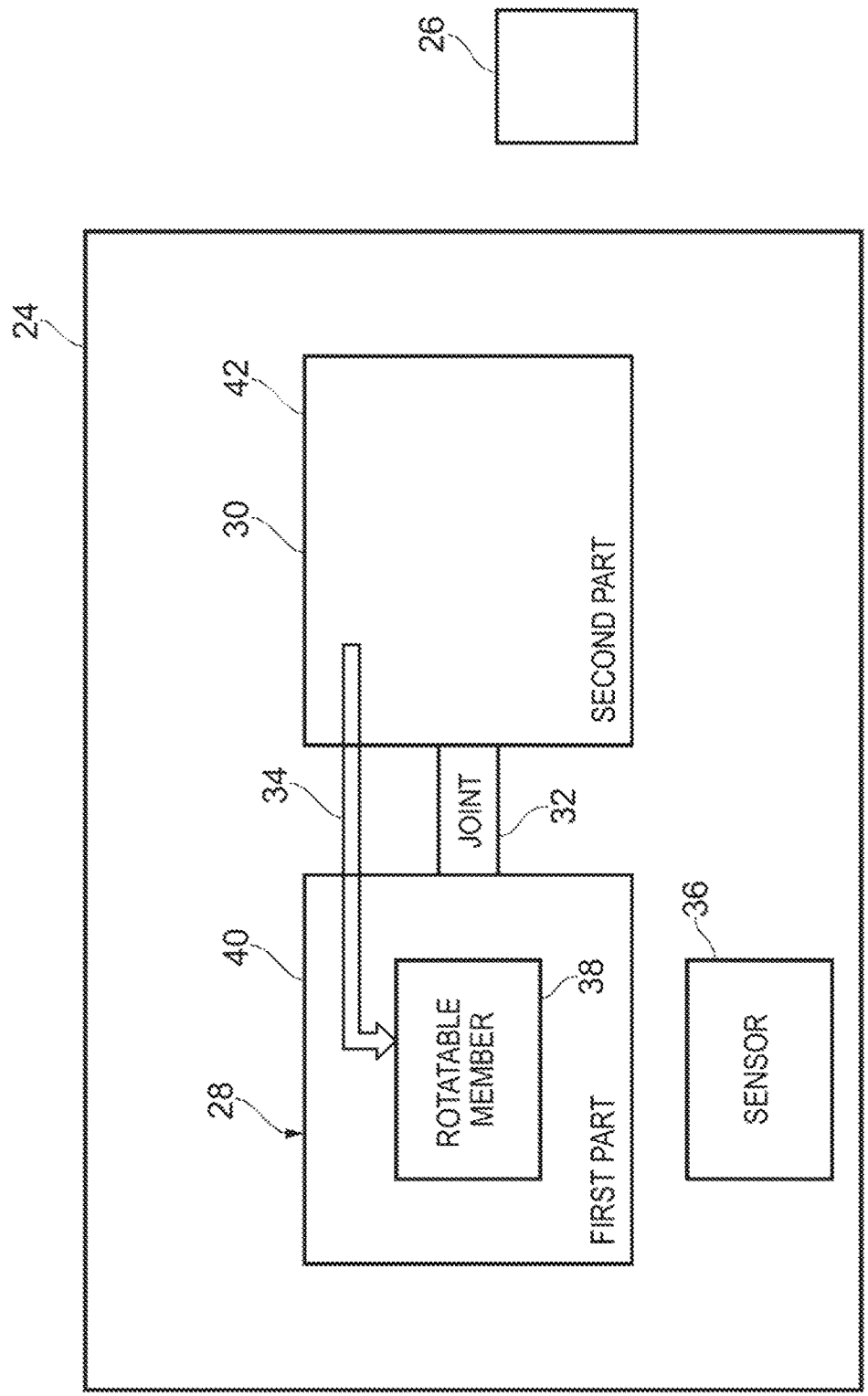
FIG. 2 illustrates a schematic diagram of a tool according to various examples.

FIG. 2 illustrates a schematic diagram of a tool 24 for machining an object 26. The tool 24 may be any suitable apparatus or device for machining the object 26. For example, the tool 24 may be any suitable rotary machine tool, and may be, for example, a blending tool, a grinding tool, or a drilling tool. The tool 24 includes a first part 28, a second part 30, a joint 32, an (optional) energy transmission member 34, a sensor 36, and a rotatable member 38 to cause rotation of a machine tool. The object 26 may be any object to be machined. For example, the object 26 may be a component of a gas turbine engine, and may be a blade or a vane of a gas turbine engine.

The first part 28 includes the rotatable member 38 and may include a first cover 40 for at least partially covering the rotatable member 38. The first cover 40 may have any suitable shape and define a cavity for receiving the rotatable member 38 therein. For example, the first cover 40 may have a circular cross sectional shape, an elliptical cross sectional shape, a square cross sectional shape or a rectangular cross sectional shape.

The second part 30 may include a second cover 42 for at least partially covering one or more components of the tool 24. The second cover 42 may have any suitable shape and define a cavity for receiving the one or more components therein. For example, the second cover 42 may have a circular cross sectional shape, an elliptical cross sectional shape, a square cross sectional shape, or a rectangular cross sectional shape.

The joint 32 is arranged to couple the first part 28 and the second part 30 to enable relative movement between the first part 28 and the second part 30. The joint 32 may comprise any suitable structure and may comprise, for example, a pivot joint, a hinge, or a resilient material interconnecting the first part 28 and the second part 30. In some examples, the joint 32 may comprise a plurality of joints that may have the same structure or a different structure to one another.

The rotatable member 38 may be any suitable apparatus or device to cause rotation of a machine tool (such as a blending tool). For example, the rotatable member 38 may include a turbine or an electrical motor. The rotatable member 38 may include, or be coupled to, a chuck for receiving a machine tool to provide torque to the machine tool.

The energy transmission member 34 extends between the first part 28 and the second part 30 and across the joint 32. The energy transmission member 34 is arranged to provide energy to the rotatable member 38 to cause rotation of the rotatable member 38. For example, where the rotatable member 38 comprises a turbine, the energy transmission member 34 may comprise a conduit to provide fluid to the turbine 38 to cause rotation of the rotatable member 38. By way of another example, where the rotatable member 38 is an electrical motor, the energy transmission member 34 may comprise one or more electrical cables to provide electrical energy to the electrical motor 38.

The sensor 36 may comprise any suitable sensor, or plurality of sensors, to sense the object 26 to be machined. The sensor 36 may comprise one or more sensors (such as one or more of, or any combination of: tachometers, inertial measurement units (IMU), inertial navigation systems (INS), encoders, torque meters, shape sensors, accelerometers) to sense one or more states of the tool 24, such as orientation, position, shape, velocity, acceleration, torque, and so on. The sensor 36 may additionally or alternatively comprise one or more sensors (such as one or more of, or any combination of: force sensors, strain gauges, pressure sensors, bending sensors, proximity sensors, imaging sensors, temperature sensors, humidity sensors, radiation detection sensors and so on) to sense one or more states external to the tool 24, such as force, strain, pressure, bend temperature, humidity, radiation, distance to an external object, size of an external object, material of an external object, and shape and orientation of an external object.

In some examples, the sensor 36 may be at least partially positioned within the second cover 42 of the second part 30. In such examples, the second cover 42 may define an aperture and the sensor 36 may be positioned adjacent the aperture to enable the sensor 36 to sense one or more states external to the tool 24.

Figure 3:
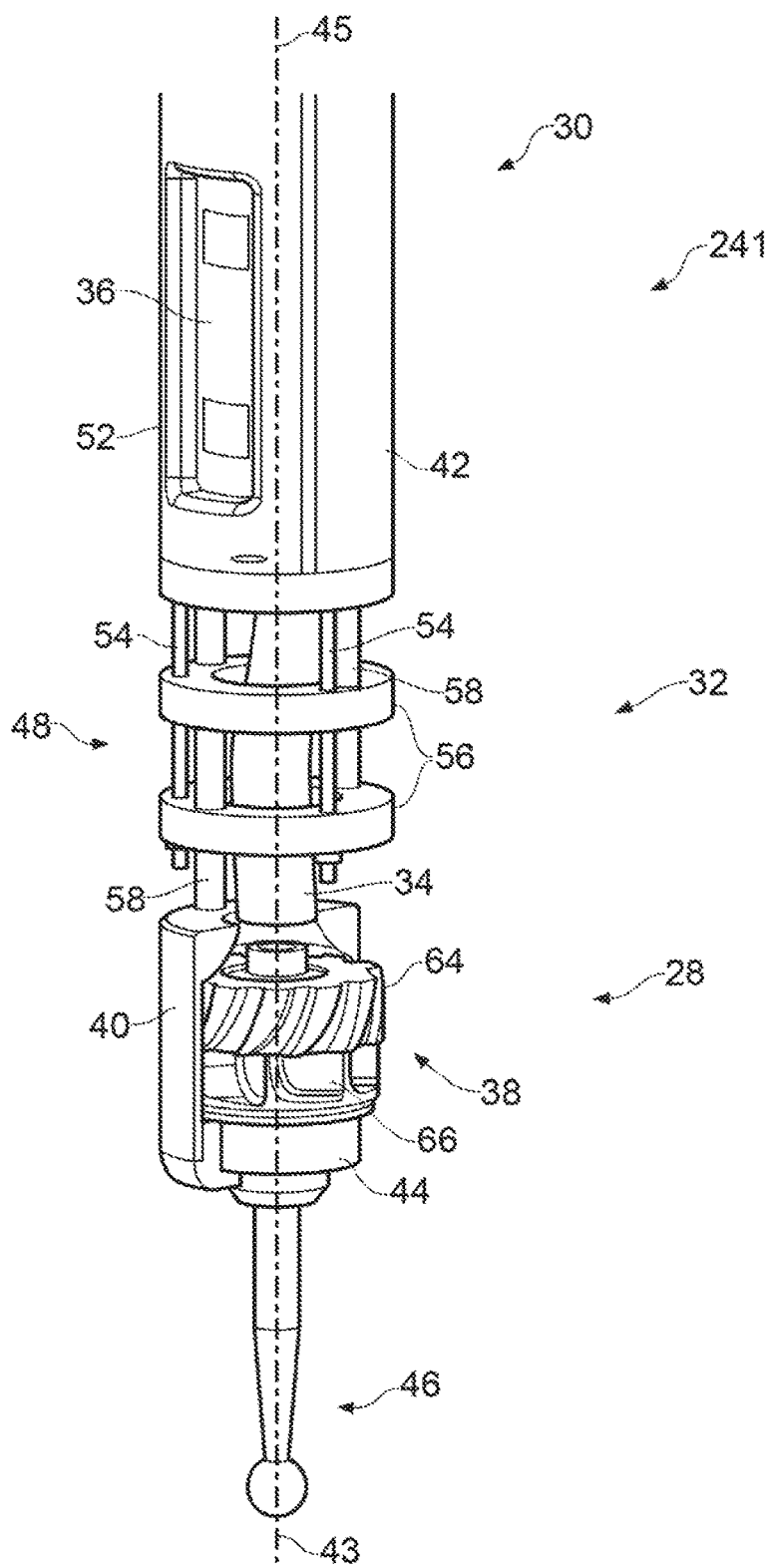
FIG. 3 illustrates a sectional perspective view of a tool according to various examples.
Figure 4:
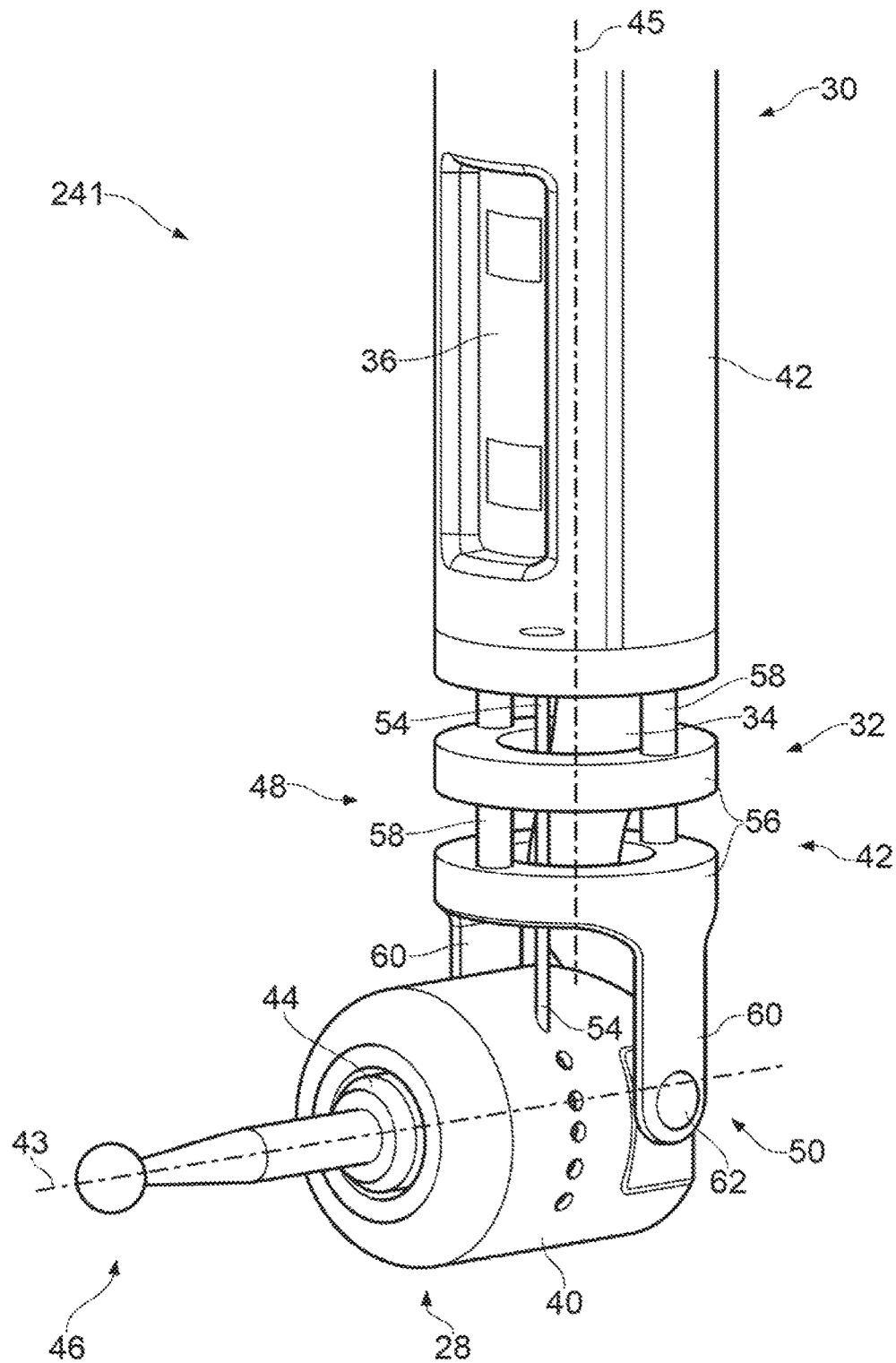
FIG. 4 illustrates a perspective view of the exterior of the tool illustrated in FIG. 3.

FIGS. 3 and 4 illustrate perspective views of another tool 241 according to various examples. The tool 241 is similar to the tool 24 and where the features are similar, the same reference numerals are used. Consequently, the tool 241 includes a first part 28, a second part 30, a joint 32, a conduit 34, a sensor 36, and a rotatable member 38. The first part 28 has a first longitudinal axis 43 that extends along the length of the first part 28, and the second part 30 has a second longitudinal axis 45 that extends along the length of the second part 30.

The tool 241 differs from the tool 24 in that the first part 40 further comprises a chuck 44 and a blending tool 46. Additionally, the joint 32 includes a first joint 48 (a cable pull joint in this example) and a second joint 50 (a pivot joint in this example).

Figure 5:
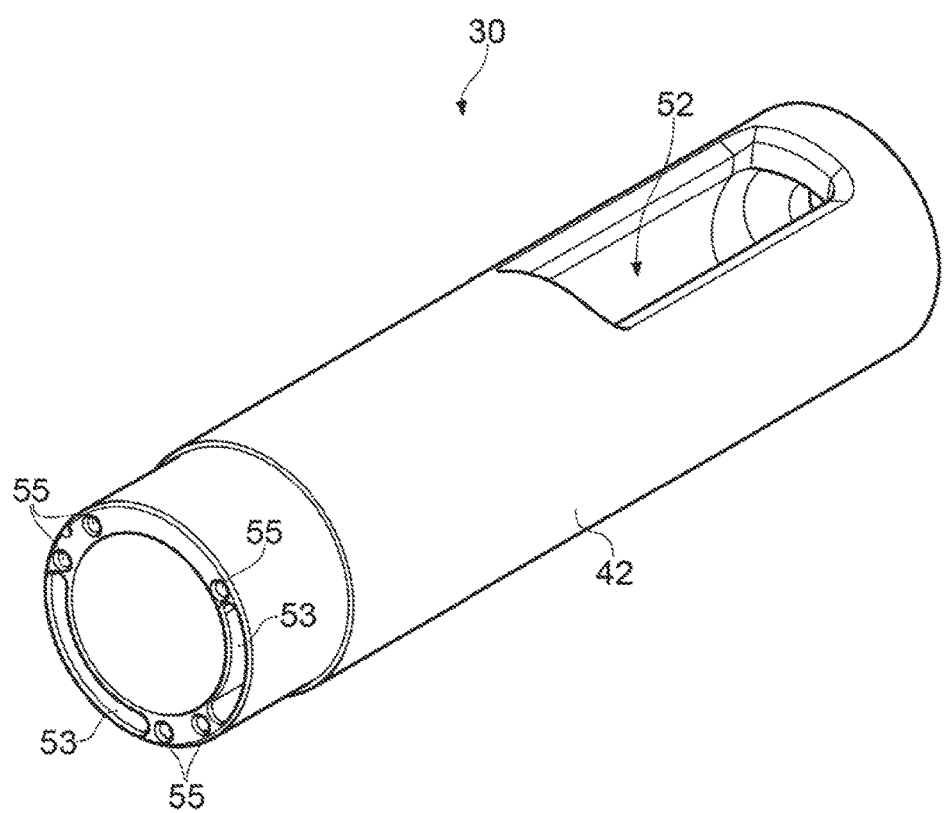
FIG. 5 illustrates a perspective view of second part of the tool illustrated in FIGS. 3 and 4.

The second cover 42 has a cylindrical shape and defines an aperture 52 there through (which may also be referred to as a 'window'). The sensor 36 is positioned within the second cover 42 and adjacent the aperture 52 to enable the sensor 36 to sense one or more states external to the tool 241. As illustrated in FIG. 5, the second cover 42 also defines a fluid flow passage 53 there within that extends along the length of the second cover 42 and is arranged to receive fluid (such as air) from a source and to provide the fluid to the conduit 34. Additionally, the second cover 42 defines one or more holes 55 that extend along the length of the second cover 42 and are arranged to receive one or more cables 54 there within. The fluid flow passage 53 and the one or more holes 55 are positioned around the perimeter of the second cover 42 which advantageously provides sufficient space within the second cover 42 for the sensor 36.

The first joint 48 comprises one or more cables 54, a plurality of discs 56 and a plurality of flexible interconnectors 58. The one or more cables 54 are coupled to the first part 28 and are moveable relative to the second part 30 to enable the first part 28 to be moved relative to the second part 30. The plurality of flexible interconnectors 58 interconnect the discs 56 and enable the discs to pivot relative to one another so that the first part 28 may extend radially outwards from the longitudinal axis 43. The plurality of discs 56 define one or more holes that extend through the discs 56 and are arranged to receive the one or more cables 54 there within. The one or more cables 54 are slidable within the one or more holes of the second cover 42 and the plurality of discs 56 respectively. In some examples, one or more of the cables 54 may not be directly connected to the first part 28 and may instead be connected to one or more of the discs 56.

The second joint 50 (not illustrated in FIG. 3 to maintain the clarity of the figure) is a pivot joint and includes a pair of arms 60 that extend towards the first part 28 from the disc 56 that is adjacent to the first part 28. The arms 60 are pivotally coupled to the first part 28 via pins 62. The first part 28 may be pivoted relative to the second part 30 at the second joint 50 via actuation of the one or more cables 54 so that the first longitudinal axis 43 of the first part 28 extends radially outwards from the longitudinal axis 43 (as illustrated in FIG. 4).

The first cover 40 of the first part 28 has a cylindrical shape and houses the rotatable member 38 that is coupled to the blending tool 46 via the chuck 44. The rotatable member 38 includes fluid guide channels 64 and a turbine 66 that is coupled to the chuck 44. The fluid guide channels 64 are fixed in position relative to the first cover 40 (that is, the fluid guide channels 64 are a static part within the first cover 40) and are arranged to receive fluid from the conduit 34. The turbine 66 is arranged to receive fluid from the fluid guide channels 64 and to rotate about the first longitudinal axis 43 relative to the first cover 40.

In operation, the fluid flow passage in the second cover 42 receives fluid (such as air) from a source (such as a pressurized air container). The fluid then flows to the turbine 66 via the conduit 34 and the fluid guide channels 64. The flow of fluid through the turbine 66 causes the turbine 66 to rotate about the first longitudinal axis 43 and thus drive the chuck 44 and the machine tool 46 to rotate about the first longitudinal axis 43.

The tool 24, 241 may provide several advantages. First, the rotatable member 38 may be arranged to rotate at relatively high speed and the tool 24, 241 may consequently require a lower force to machine the object 26. For example, where the rotatable member 38 includes a turbine (such as the turbine 66), the turbine may rotate at 200,000 to 400,000 RPM. Second, the inclusion of the sensor 36 may enable an operator of the tool 24, 241 to inspect and measure the object 26 during machining. This may significantly reduce the time required to machine the object 26 relative to the use of a machining tool and separate sensing device. For example, where the object 26 is a blade within a gas turbine engine and the tool 24, 241 is a blending tool, use of the tool 24, 241 may reduce the time required to blend the blade by up to fifty times. Third, the positioning of the fluid flow passage 53 and the holes 55 may advantageously enable sufficient fluid to be provided to the turbine 66 and enable the sensor 36 to be positioned within the second cover 42. This may advantageously reduce the size of the tool 24, 241 and enable the tool 24, 241 to be inserted into relatively narrow spaces within a mechanical system.

Figure 6:
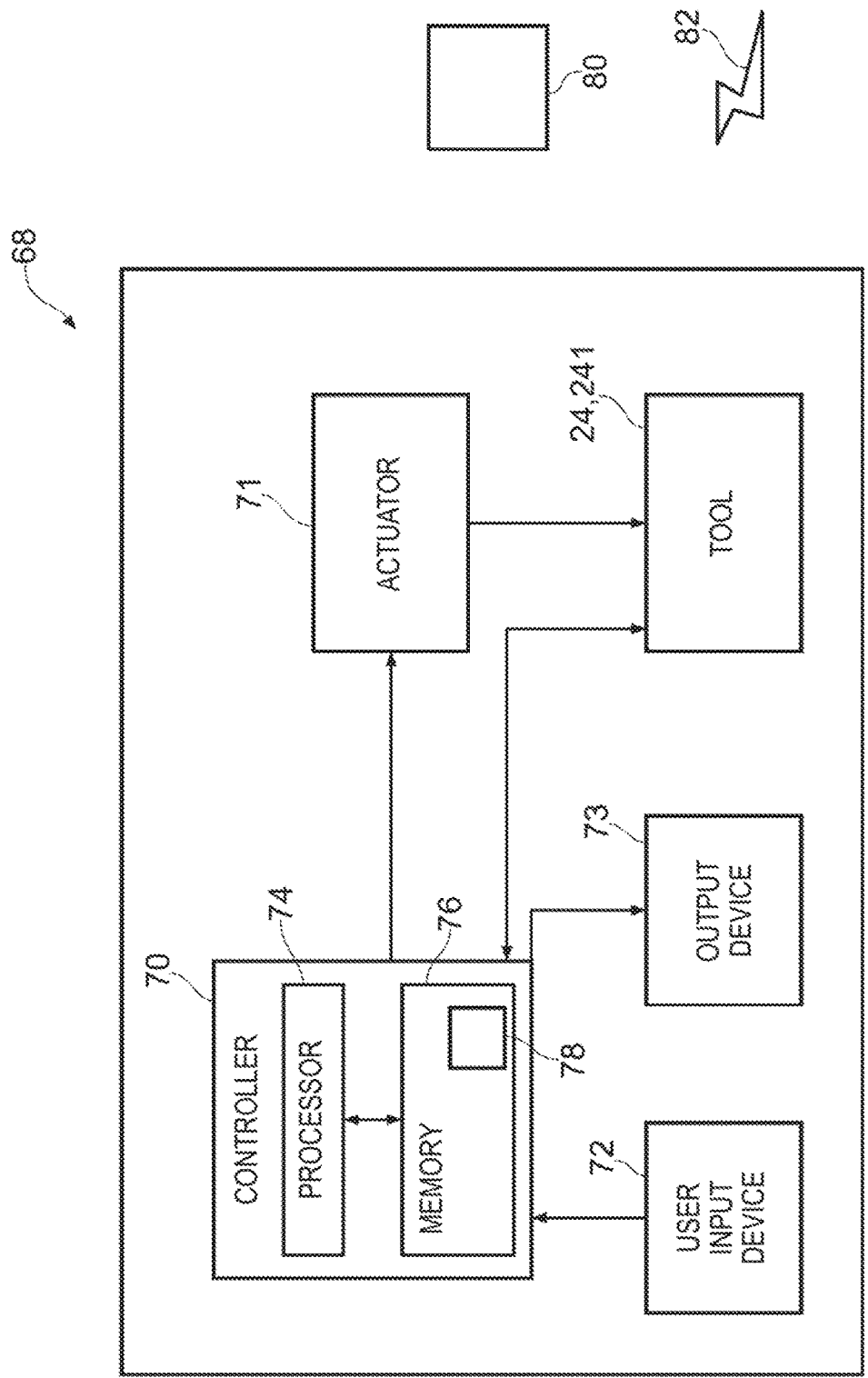
FIG. 6 illustrates a schematic diagram of apparatus for controlling machining according to various examples.

FIG. 6 illustrates a schematic diagram of apparatus 68 for controlling machining according to various examples. The apparatus 68 includes a controller 70, an actuator 71, a user input device 72, an output device 73, and the tool 24, 241. In some examples, the apparatus 68 may be a single, unitary device where the controller 70, the actuator 71, the user input device 72, the output device 73, and the tool 24, 241 are physically coupled together. In other examples, the apparatus 68 may be an apparatus that is distributed across a plurality of different locations (for example, the apparatus 68 may be distributed across different cities, different counties or different countries).

In some examples, the apparatus 68 may be a module. As used herein, the wording 'module' refers to a device or apparatus where one or more features are included at a later time, and possibly, by another manufacturer or by an end user. For example, where the apparatus 68 is a module, the apparatus 68 may only include the controller 70, and the remaining features may be added by another manufacturer, or by an end user.

Figure 7:
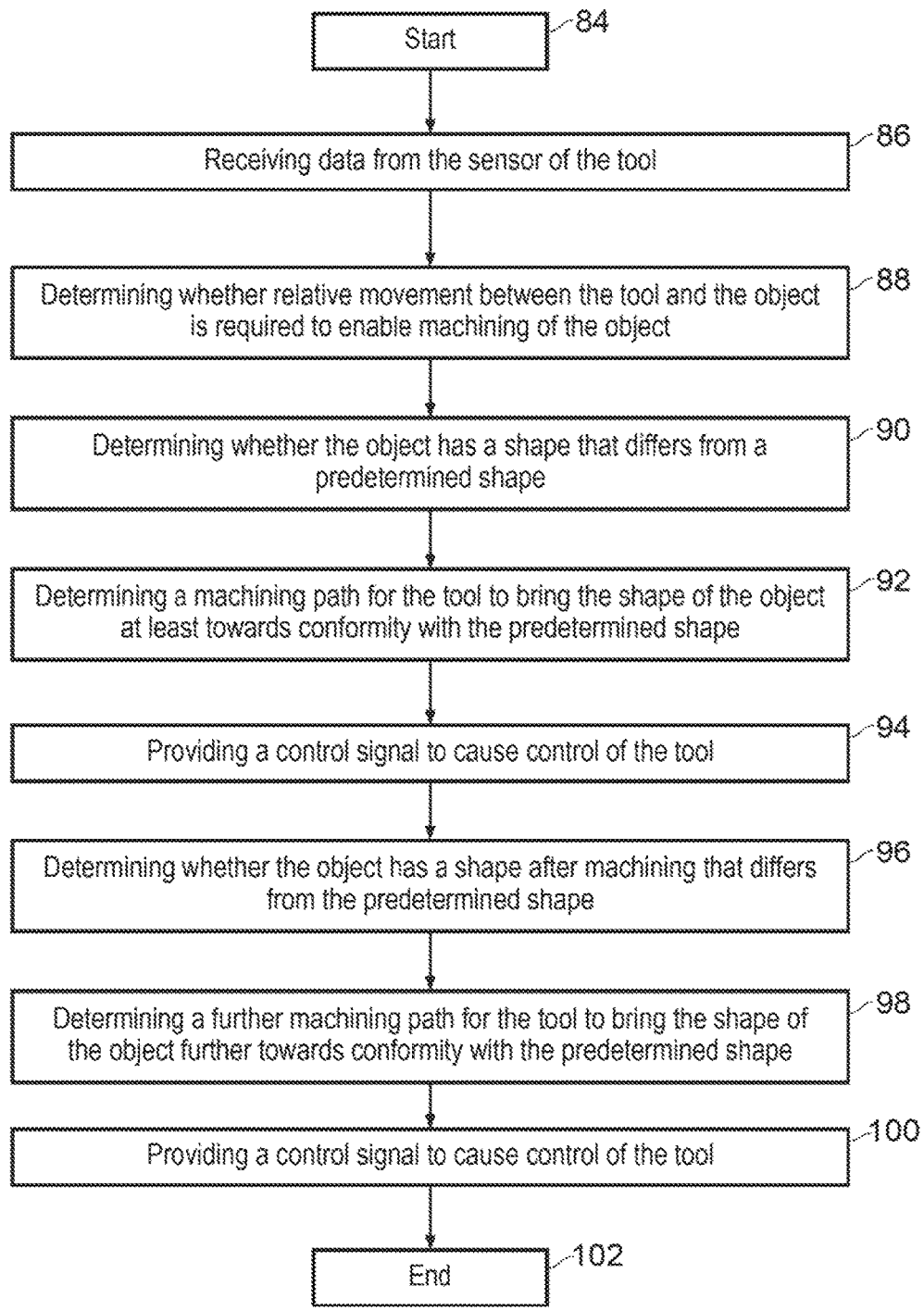
FIG. 7 illustrates a flow diagram of a method of controlling machining according to various examples.
Figure 9:
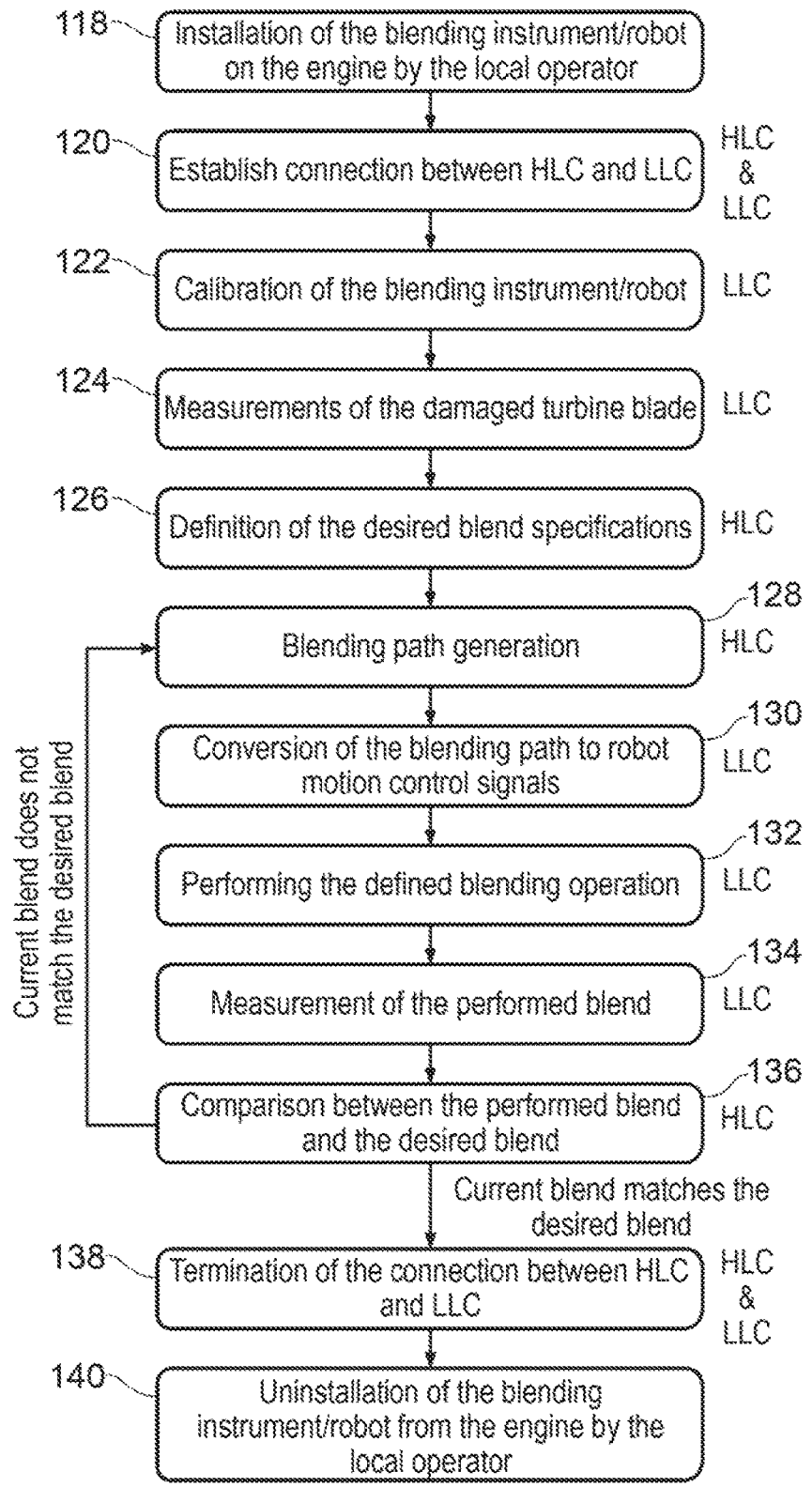
FIG. 9 illustrates a flow diagram of another method of controlling machining according to various examples.

The controller 70 may comprise any suitable circuitry to cause performance of the methods described herein and as illustrated in FIGS. 7 & 9. The controller 70 may comprise any of, or combination of: application specific integrated circuits (ASIC); field programmable gate arrays (FPGA); single or multi-processor architectures; sequential (Von Neumann)/parallel architectures; programmable logic controllers (PLCs); microprocessors; and microcontrollers, to perform the methods.

By way of an example, the controller 70 may comprise at least one processor 74 and at least one memory 76. The memory 76 stores a computer program 78 comprising computer readable instructions that, when read by the processor 74, causes performance of the methods described herein, and as illustrated in FIGS. 7 & 9. The computer program 78 may be software or firmware, or may be a combination of software and firmware.

The processor 74 may be located on the tool 24, 241, or may be located remote from the tool 24, 241, or may be distributed between the tool 24, 241 and a location remote from the tool 24, 241. The processor 74 may include at least one microprocessor and may comprise a single core processor, or may comprise multiple processor cores (such as a dual core processor or a quad core processor).

The memory 76 may be located on the tool 24, 241, or may be located remote from the tool 24, 241, or may be distributed between the tool 24, 241 and a location remote from the tool 24, 241. The memory 76 may be any suitable non-transitory computer readable storage medium, data storage device or devices, and may comprise a hard disk and/or solid state memory (such as flash memory). The memory 76 may be permanent non-removable memory, or may be removable memory (such as a universal serial bus (USB) flash drive).

The computer program 78 may be stored on a non-transitory computer readable storage medium 80. The computer program 78 may be transferred from the non-transitory computer readable storage medium 80 to the memory 76. The non-transitory computer readable storage medium 80 may be, for example, a USB flash drive, a compact disc (CD), a digital versatile disc (DVD) or a Blu-ray disc. In some examples, the computer program 78 may be transferred to the memory 76 via a wireless signal 82 or via a wired signal 82.

The actuator 71 may comprise any suitable device or devices for controlling the tool 24, 241. For example, the actuator 71 may comprise one or more servomotors that are coupled to the one or more cables 54 of the tool 241 to move the first part 28 relative to the second part 30. The actuator 71 may also comprise a fluid source (such as a compressed air container) that is arranged to provide fluid to the fluid flow passages of the second cover 42. The controller 70 is configured to provide control signals to the actuator 71 to control the operation of the actuator 71.

The sensor 36 of the tool 24, 241 is arranged to receive control signals from the controller 70 that control the operation of the sensor 36. For example, where the sensor 36 includes an imaging device (such as a CCD or CMOS camera), the controller 70 may be configured to control the optical zoom and/or focal point of the imaging device. The sensor 36 is arranged to provide signals to the controller 70 for the sensed state of the tool 24, 241 and/or for the sensed external state of the tool 24, 241.

The user input device 72 may be any suitable device, or devices, for enabling a user to control the apparatus 68. For example, the user input device 72 may comprise one or more of, or any combination of: a keyboard, a keypad, a touch-screen display, a computer mouse, and a touchpad. The controller 70 is configured to receive user input control signals from the user input device 72.

The output device 73 may be any suitable device for presenting information to a user of the apparatus 68. The output device 73 may comprise a display (such as a liquid crystal display (LCD), a light emitting diode (LED) display, or a thin film transistor (TFT) display for example). The controller 70 may be configured to cause control of the display to display images. For example, the controller 70 may receive image data from the sensor 36 of the tool 24, 241 and then cause control of the display of the output device 73 to display an image using the received image data. The output device 73 may additionally or alternatively comprise a loudspeaker to provide acoustic waves to the user of the apparatus 68 and the controller 70 may be configured to cause control of the loudspeaker to provide acoustic waves. In some examples, the output device 73 may include an actuator that may be used to rotate a rotor of a gas turbine engine to position the object 26.

The operation of the apparatus 68 is described in the following paragraphs with reference to FIG. 7.

At block 84, the method starts and a user may mount at least the tool 24, 241 on a mechanical system such as a gas turbine engine. The user may initialise the apparatus 68 by operating the user input device 72. For example, where the user input device 72 includes a power switch, the user may initialise the apparatus 68 by pressing the power switch to supply electrical energy to the apparatus 68. By way of another example, the user may initialise the apparatus 68 by interacting with a graphical user interface displayed on a display of the output device 73 using the user input device 72 to execute the computer program 78.

At block 86, the method includes receiving data from the sensor 36 of the tool 24, 241. For example, the data may include image data from the sensor 36 for the view out of the aperture 52. The controller 70 may receive the data from the sensor 36 and cause control of the output device 73 to present information to the user using the received data. For example, where the controller 70 receives image data from the sensor 36, the controller 70 may cause control of a display of the output 73 to display the image in the image data.

At block 88, the method includes determining whether relative movement between the tool 24, 241 and the object 26 is required to enable machining of the object 26 by the tool 24, 241. For example, the controller 70 may analyse image data received in block 86 to determine whether the object 26 to be machined is positioned at a predetermined position and/or orientation relative to the tool 24, 241. By way of another example, where the sensor 36 includes an ultrasonic sensor for transmitting and sensing ultrasonic acoustic waves, the controller 70 may analyse data from the ultrasonic sensor to determine whether the object 26 to be machined is positioned at a predetermined position and/or orientation relative to the tool 24, 241.

Where the controller 70 determines that the object 26 is not positioned at the predetermined position and/or orientation, the controller 70 determines that relative movement between the tool 24, 241 and the object 26 is required to enable machining of the object 26. The controller 70 may then cause control of the output device 73 to present information to the user of the apparatus 68 to inform the user to move the object 26 and/or the tool 24, 241. For example, where the object 26 is a fan blade or a compressor blade, the controller 70 may cause control of the output device 73 to present information to the user to inform the user to move the fan blade or compressor by a certain angle in either the clockwise or anticlockwise direction. In some examples, the controller 70 may provide a control signal to the tool 24, 241 and/or the object 26 to cause the tool 24, 241 and/or the object 26 to move relative to one another (for example, the tool 24, 241 may include robotics that enable the tool 24, 241 to move relative to the object 26 to the predetermined position).

Block 88 may then be repeated until the controller 70 determines that the object 26 is positioned at the predetermined position and/or orientation relative to the tool 24, 241. Where the controller 70 determines that the object 26 is positioned at the predetermined position and/or orientation relative to the tool 24, 241, the method moves to block 90.

At block 90, the method includes determining whether the object 26 has a shape that differs from a predetermined shape to determine whether the object 26 is damaged. The memory 76 may store predetermined shapes for one or more different objects. In some examples, the controller 70 may compare the similarity of the sensed shape of the object 26 with the predetermined shape of the object stored in the memory 76 to determine whether the similarity is below a threshold similarity value. By way of another example, the controller 70 may compare the differences between the sensed shape of the object 26 and the predetermined shape of the object stored in the memory 76 to determine whether the difference is above a threshold difference value.

For example, a predetermined shape of the compressor blade may be stored in the memory 76. The controller 70 may compare the similarity of the sensed shape of the compressor blade with the predetermined shape of the compressor blade stored in the memory 76 to determine whether the similarity is below a threshold similarity value.

Where the controller 70 determines that the shape of the object 26 does not differ from (or is similar to) the predetermined shape of the object 26, the method may return to block 86 for another different object. Where no further objects are to be machined, the method moves to block 102 and is ended. Where the controller 70 determines that the shape of the object 26 differs from (or is not similar to) the predetermined shape of the object 26, the method moves to block 92.

At block 92, the method includes determining a machining path for the tool 24, 241 to bring the shape of the object 26 at least towards conformity with the predetermined shape. In some examples, the determined machining path for the tool 24, 241 is generated to bring the shape of the object 26 into full conformity with the predetermined shape (that is, so that they have the same shape after machining). According to various examples, a machining path may be determined by generating a surface from the damaged site using the sensor 36 (for example, by creating a mesh from point cloud data). Then, using a pre-set scallop geometry (one of either a tip blend, or a normal scallop blend), a tool path is matched to the size required by the user. This tool path is then broken into a number of steps to provide an iterative formation of the shape. A collision check is then performed using the inverse kinematics of the controller 70 to ascertain if the tool 24, 241 will collide with anything, and if not, the method moves to block 94. The controller 70 may store the generated machining path in the memory 76.

At block 94, the method includes providing a control signal to cause control of the tool 24, 241. The controller 70 may use the machining path generated at block 92 to cause control of the tool 24, 241 to machine the object 26. For example, the controller 70 may convert the machining path into a control signal to cause control of the tool 24, 241. In some examples, the controller 70 may directly control the tool 24, 241 to machine the object 26. In other examples, the controller 70 may indirectly control the tool 24, 241 by sending a control signal to one or more other controllers that then directly control the tool 24, 241 (in other words, there may be one or more other controllers in the control path between the controller 70 and the tool 24, 241).

At block 96, the method includes determining whether the object 26 has a shape after machining that differs from the predetermined shape. For example, the controller 70 may receive data from the sensor 36 of the tool 24, 241 for the machined object 26 and then use that data to determine whether the shape of the object 26 is below a threshold similarity value when compared with the predetermined shape, or may use that data to determine whether the shape of the object 26 is above a threshold difference value when compared with the predetermined shape.

Where the controller 70 determines that the shape of the machined object 26 does not differ from (or is similar to) the predetermined shape of the object 26, the method may return to block 86 for another different object. Where no further objects are to be machined, the method moves to block 102 and is ended.

Where the controller 70 determines that the shape of the machined object 26 differs from (or is not similar to) the predetermined shape of the object 26, the method moves to block 98.

At block 98, the method includes determining a further machining path for the tool 24, 241 to bring the shape of the object 26 further towards conformity with the predetermined shape.

At block 100, the method includes providing a control signal to cause control of the tool 24, 241. The controller 70 may use the machining path generated at block 98 to cause control of the tool 24, 241 to further machine the object 26. In some examples, the controller 70 may directly control the tool 24, 241 to machine the object 26. In other examples, the controller 70 may indirectly control the tool 24, 241 by sending a control signal to one or more other controllers that then directly control the tool 24, 241.

The method then returns to block 96 to determine whether the object 26 has a shape after machining that differs from the predetermined shape. Where the controller 70 determines that the shape of the machined object 26 does not differ from (or is similar to) the predetermined shape of the object 26, the method may return to block 86 for another, different object. Where no further objects are to be machined, the method moves to block 102 and is ended. Where the controller 70 determines that the shape of the machined object 26 differs from (or is not similar to) the predetermined shape of the object 26, the method moves to block 98.

The apparatus 68 may provide several advantages. For example, the apparatus 68 may enable a machining operation (such as blending for example) to be performed automatically by the controller 70 and without human intervention. This may enable repair quality to be standardised. Additionally, the output device 73 may advantageously enable an operator to visually inspect the damaged component of the mechanical system during and after machining.

Figure 8:
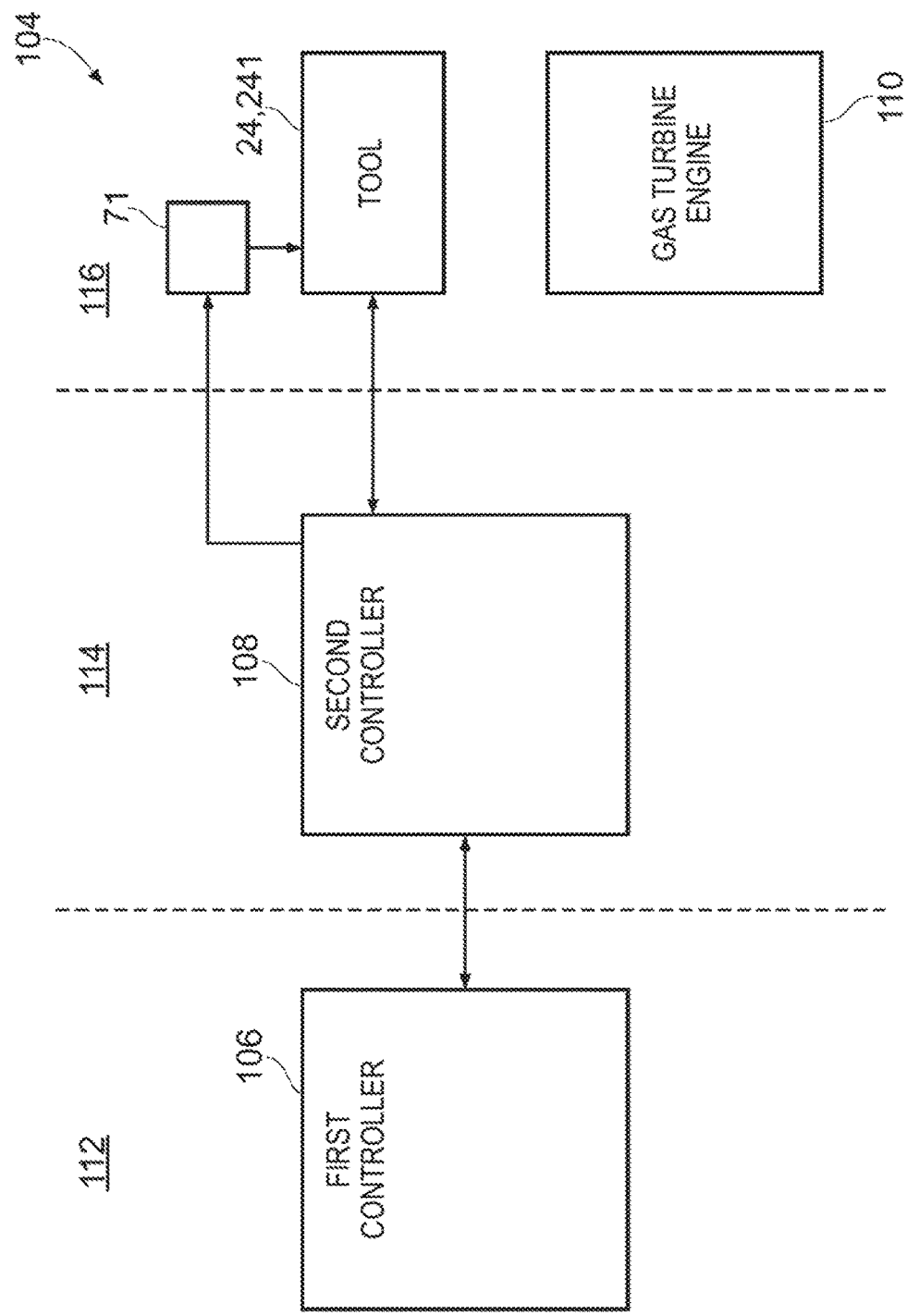
FIG. 8 illustrates a schematic diagram of another apparatus for controlling machining according to various examples.

FIG. 8 illustrates a schematic diagram of another apparatus 104 for controlling machining according to various examples. The apparatus 104 includes a first controller 106, a second controller 108, the actuator 71, the tool 24, 241, and a mechanical system 110. The apparatus 104 is similar to the apparatus 68 illustrated in FIG. 6 and where the features are similar, the same reference numerals are used.

The first controller 106 may be referred to as a 'high level controller (HLC)' and may comprise a structure as described in the preceding paragraphs for the controller 70. The controller 106 may include a virtual reality simulator (VRS), a graphical user interface (GUI), a database, and a high level control communicator (HLCC) that includes a secure protocol engine and command processor. The first controller 106 is located in a first zone 112 and may also be connected to a user input device 72 and an output device 73 as illustrated in FIG. 6.

The second controller 108 may be referred to as a 'low level controller (LLC)' and may comprise a structure as described in the preceding paragraphs for the controller 70. The controller 108 may include a tool controller, a graphical user interface (GUI), and a low level control communicator (LLCC) that includes a secure protocol engine and command processor. The second controller 108 is located in a second zone 114 and may also be connected to a user input device 72 and an output device 73 as illustrated in FIG. 6.

Figure 1:
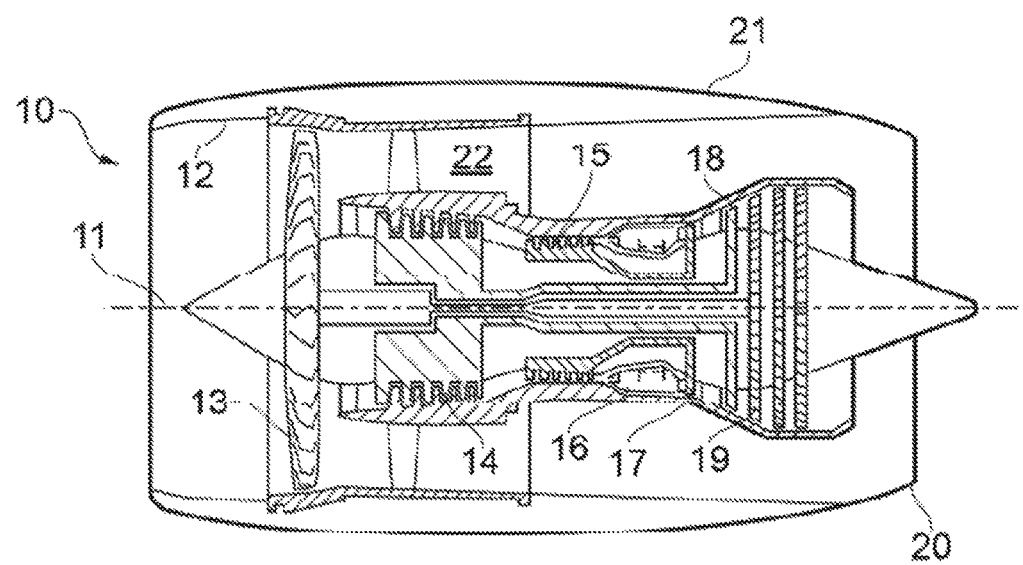
FIG. 1 illustrates a cross sectional side view of a gas turbine engine.

The actuator 71, tool 24, 241 and the mechanical system 110 are located in a third zone 116. In some examples, the mechanical system 110 is a gas turbine engine and may be structured as illustrated in FIG. 1 (in other words, the gas turbine engine may be a three shaft gas turbine engine 10 as illustrated in FIG. 1).

The first controller 106, the second controller 108, the actuator 71 and the tool 24, 241 may be connected to one another via any suitable network that includes wired connections and/or wireless connections. For example, the first controller 106 and the second controller 108 may be coupled to one another via a wired connection (for example, via intercontinental data cables) or via a wireless connection (for example, via a satellite connection). By way of another example, the second controller 108 and the tool 24, 241 may be coupled to one another via a wired connection (for example, via an Ethernet cable) or via a wireless connection (for examples, via a local wireless area network (WEAN)).

The first zone 112, the second zone 114, and the third zone 116 may represent different locations. For example, the first zone 112, the second zone 114, and the third zone 116 may represent different countries, states, counties, or cities. By way of an example, the first zone 112 may represent a control centre in a first country, the second zone 114 may represent a control centre in a second country, and the third zone 116 may represent an aircraft maintenance hangar in the second country. In some examples, the second zone 114 and the third zone 116 may be the same location and consequently, the second controller 108 may be located in closer proximity to the tool 24, 241 than the first controller 106. For example, the first zone 112 may represent a control centre in a first country, and the second and third zones 114, 116 may represent an aircraft maintenance hangar in a second country.

The operation of the apparatus 104 is described in the following paragraphs with reference to FIG. 9.

At block 118, the method includes installation of the tool 24, 241 (referred to as the blending instrument/robot in FIG. 9) on the mechanical system 110 by the local operator.

At block 120, the method includes establishing a data connection between the first controller 106 and the second controller 108.

At block 122, the method includes calibrating the tool 24, 241. For example, the second controller 108 may calibrate the tool 24, 241 using data stored at the second controller 108.

At block 124, the method includes obtaining measurements of an object 26 of the mechanical system 110. For example, block 124 may include obtaining measurements of a damaged turbine blade of a gas turbine engine. Block 124 may be performed by the second controller 108.

At block 126, the method includes providing a definition of the desired blend specifications, which may be performed by the first controller 106.

At block 128, the method includes generating a blending path, which may be performed by the first controller 106. For example, the first controller 106 may receive the measurements from the second controller 108 and then use the received measurements and the blend specification provided in block 126 to generate a blending path.

At block 130, the method includes conversion of the blending path to tool motion control signals, which may be performed by the second controller 108. For example, the second controller 108 may receive the generated blending path from the first controller 106 and then convert the blending path to tool motion control signals.

At block 132, the method includes performing the defined blending operation, which may be performed by the second controller 108, the actuator 71, and the tool 24, 241. For example, the second controller 108 may provide the tool motion control signals to the actuator 71 and to the tool 24, 241 to control blending of the damaged turbine blade.

At block 134, the method includes measuring the performed blend, which may be performed by the second controller 108. For example, the second controller 108 may receive data from the sensor 36 of the tool 24, 241 and use the received data to measure the blend.

At block 136, the method includes comparing the performed blend and the desired blend. For example, the first controller 106 may receive measurement data from the second controller 108 (determined in block 134) and use the received measurement data to compare the performed blend and the desired blend. Where the performed blend does not match the desired blend, the method returns to block 128 and the first controller 106 generates a new blending path. Where the performed blend matches the desired blend and another object requires blending, the method returns to block 124. Where the performed blend matches the desired blend and no further objects require blending, the method moves to block 138.

At block 138, the method includes terminating the connection between the first controller 106 and the second controller 108.

At block 140, the method includes uninstalling the tool 24, 241 from the mechanical system 110 by the local operator.

The apparatus 104 may provide several advantages. For example, there are typically few operators who are sufficiently skilled and experienced to perform blending on internal components of a gas turbine engine. The apparatus 104 may advantageously enable such operators to monitor and/or control blending remotely (for example, through interaction with the first controller 106) and without being required to travel to the gas turbine engine. In other words, the operator may remain in the first zone 112 and monitor and/or control blending of damaged gas turbine engine components in other zones (such as the third zone 116). This may advantageously enable the operator to repair a greater number of components and may also advantageously reduce the cost of blending operations (since the operator may spend less time and money on travelling).

It will be understood that the various apparatus and methods are not limited to the embodiments above-described and various modifications and improvements can be made without departing from the concepts described herein.

For example, the tool 24, 241 may not include a rotatable member and machine head and may instead include one or more of: a laser head, an imaging sensor (for example, a charge coupled device camera), a Raman spectrometer, a fluorescent penetrant applicator, and an ultraviolet (UV) inspection device.

Except where mutually exclusive, any of the features may be employed separately or in combination with any other features and the disclosure extends to and includes all combinations and sub-combinations of one or more features described herein.

The invention claimed is:

1. A tool for machining an object, the tool comprising:
a first part including a rotatable member, the rotatable member being rotatable to cause rotation of a machine tool;
a second part including:
a cover having an aperture and forming a fluid flow passage having an arcuate cross-section and extending longitudinally through the cover; and
a sensor positioned within the cover and adjacent to the aperture and the fluid flow passage, the sensor being configured to sense the object to be machined; and a joint coupling the first part and the second part to enable relative movement between the first part and the second part.

2. The tool as claimed in claim 1, wherein the sensor is configured to provide image data and/or measurement data of the object to be machined.

3. The tool as claimed in claim 1, further comprising an energy transmission member extending between the first part and the second part and across the joint, the energy transmission member being arranged to provide energy to the rotatable member to cause rotation of the rotatable member.

4. The tool as claimed in claim 3, wherein the energy transmission member includes a conduit to provide fluid to the rotatable member.

5. The tool as claimed in claim 1, wherein the rotatable member includes a turbine.

6. The tool as claimed in claim 1, wherein the joint includes one or more cables coupled to the first part, the one or more cables being moveable relative to the second part to enable the first part to be moved relative to the second part.

7. The tool as claimed in claim 1, wherein the machine tool is coupled to the rotatable member and receives torque from the rotatable member.

8. The tool as claimed in claim 7, wherein the machine tool includes a blending tool.

9. An apparatus for controlling machining, the apparatus comprising:
a controller configured to:
receive data from the sensor of the tool as claimed in claim 1;
determine control of the tool using the received data; and
provide a control signal to cause control of the tool.

10. The apparatus as claimed in claim 9, wherein the controller is configured to determine whether relative movement between the tool and the object is required to enable machining of the object by the tool.

11. The apparatus as claimed in claim 9, wherein the controller is configured to determine control of the tool by:
determining whether the object has a shape that differs from a predetermined shape above a threshold level; and
determining a machining path for the tool to bring the shape of the object at least towards conformity with the predetermined shape.

12. The apparatus as claimed in claim 11, wherein the controller is configured to:
determine whether the object has a shape after machining that differs from the predetermined shape above the threshold level; and
determine a further machining path for the tool to bring the shape of the object further towards conformity with the predetermined shape.

13. The apparatus as claimed in claim 9, wherein the controller is configured to operate without user intervention.

14. The apparatus as claimed in claim 9, wherein the controller includes a first controller and a second controller, the first controller determines the control of the tool, and the second controller provides the control signal to the tool to control the apparatus.

15. The apparatus as claimed in claim 14, wherein the second controller is located in closer proximity to the tool than the first controller.

16. The apparatus as claimed in claim 14, wherein:
the first controller is configured to:
receive data from the sensor, and
provide the data to the second controller, and
the second controller is configured to determine a machining path for the tool.

17. The apparatus as claimed in claim 16, wherein the second controller is configured to:
receive the machining path from the first controller, and
convert the machining path into control signals to control the tool.

18. A method of controlling machining, the method comprising:
receiving data from the sensor of the tool as claimed in claim 1;
determining control of the tool using the received data; and
providing a control signal to cause control of the tool.

* * * * *